United States Patent [19]

Kishikawa et al.

[11] 3,970,863

[45] July 20, 1976

[54] ELEMENT AND METHOD FOR DETECTING LEAKAGE OF PETROLEUM PRODUCTS

[75] Inventors: Hiroshi Kishikawa, Toyonaka; Takayoshi Adachi, Nishinomiya; Tamio Usami, Kokubunji, all of Japan

[73] Assignees: Sumitomo Chemical Company, Limited, Osaka; Japanese National Railways, Tokyo, both of Japan

[22] Filed: Dec. 13, 1974

[21] Appl. No.: 532,600

[30] Foreign Application Priority Data

Dec. 18, 1973   Japan.............................. 48-142672

[52] U.S. Cl............................... 307/116; 340/242; 200/61.08
[51] Int. Cl.²........................................ H01H 35/00
[58] Field of Search............................ 307/116, 118; 200/61.03–61.07, 61.08, 264; 340/242; 73/40, 40.5 R, 40.5 A

[56] References Cited
UNITED STATES PATENTS

| | | |
|---|---|---|
| 2,386,412 | 10/1945 | Wakefield...................... 340/242 X |
| 2,432,367 | 12/1947 | Andresen......................... 200/61.04 |
| 2,691,134 | 10/1954 | Ford ..................................... 340/242 |
| 3,427,414 | 2/1969 | Sheldahl ..................... 200/61.08 X |
| 3,470,340 | 9/1969 | Hakka............................. 200/61.04 |
| 3,564,526 | 2/1971 | Butts................................ 200/61.08 |
| 3,720,797 | 3/1973 | Gunn ................................... 340/242 |

*Primary Examiner*—Robert K. Schaefer
*Assistant Examiner*—M. Ginsburg
*Attorney, Agent, or Firm*—Stevens, Davis, Miller & Mosher

[57] ABSTRACT

A styrene-butadiene-styrene block copolymer containing 50 to 70% by weight of butadiene can be used as a base material of an element capable of detecting leakage of petroleum products by detecting to the change in an electrical signal. By use of this detecting element any leakage of petroleum products from a transportation pipe line may be detected and located quickly and precisely.

10 Claims, No Drawings

ELEMENT AND METHOD FOR DETECTING LEAKAGE OF PETROLEUM PRODUCTS

This invention relates to a terminal detecting element for use in a detecting system capable of electrically detecting and locating any leakage of petroleum products, such as gasoline, kerosene, light oil, and the like, from a transportation pipeline, and to a detecting and locating method by use of said element.

Generally, in pipeline transportation of petroleum products, it is essential from the viewpoint of hazard prevention and of environmental protection that any leakage of the petroleum products from the pipeline may be detected and located easily, quickly, and precisely and that the pipeline may be kept under constant watch for anything abnormal.

The detecting methods which have been conventionally adopted include those depending on the difference in rate of flow at both ends of a pipeline or the change in pressure loss along a pipeline, or on a gas detector sensitive to a vapor of petroleum products. These conventional methods, however, cannot be considered always advantageous with respect to accuracy, detection of the location of the leakage, and installation cost.

On the other hand, it has been known from Japanese patent application laid open (Kokai) Nos. 15,585/73 and 20,584/73 that a method utilizing the electrical change at definite intervals as a means of detection, as in the railway signal, is a simplified way of accurately locating a leakage and of keeping a pipeline under constant surveillance. Such a detecting system utilizes a detecting element in cable form comprising a material bearing an electroconductive thin layer, which material dissolves or disintegrates when in contact with the fluid. The detecting element is installed along a fluid pipeline and carries an electric pulse signal or a high frequency current. When the said conductive thin layer is broken at a certain point, the transfer time of the reflected pulse from the point of breakage is determined or a leakage current to the ground surface is detected to locate an oil leakage.

In another proposed locating system for oil leakage, the detecting element carries a direct or alternating current and the change in impedance due to breakage of the detecting element is detected.

The above-noted systems, however, are not always successful in quickly detecting the leakage of petroleum products, because it is an unfortunate fact at present that there has been found no such a base material of the detecting element for use in the above-mentioned systems that swells or dissolves rapidly in petroleum products such as gasoline, kerosene, and light oil.

A base material of the element for use in detecting and locating the leakage of petroleum products such as gasoline, kerosene, and light oil is desired not only to swell or dissolve rapidly in petroleum products, but also to have sufficient durability under wet conditions prevailing under the ground where pipelines are laid. It is desirable, moreover, that the base material may be easily fabricated into various forms suitable for use in the detecting system and that the material requires no special precaution in processing and in application. From the viewpoints enumerated above, a thermoplastic resin is suitable for use as the base material.

The materials generally known to swell or dissolve easily in petroleum products are rubbery substances such as natural rubber, styrene-butadiene rubber (SBR), and butyl rubber (BR), and polystyrene, asphalt, and pitch. These materials, however, swell or dissolve to less degree in light oil which is a higher boiling fraction as compared with gasoline, and kerosene, though more easily in lower boiling fractions such as gasoline and kerosene. Moreover, the degree of swelling and solubility of the said materials in gasoline and kerosene are superior to those of other substances but not sufficiently high to cause a volume change and, hence, an electrical change in a matter of minutes to meet the object of this invention.

Under the circumstances mentioned in the foregoing, the present inventors continued investigations with the object of finding a substance suitable as a base material of a detecting element for use in the afore-said detecting system, which element is capable of transforming a volume change caused in an oil-soluble material due to swelling or dissolution into an electrical change. As a result, it was found that the above object can be met by a styrene-butadiene-styrene block copolymer (hereinafter abbreviated as S-B-S block copolymer). Based on this finding, the present invention has been accomplished.

An object of this invention is to provide a novel element and a novel method for detecting and locating the leakage of petroleum products by means of a change in an electrical signal.

Other objects and advantages of the invention will become apparent from the following description.

According to this invention, leakage of petroleum products such as gasoline, kerosene, and light oil may be detected and located quickly and precisely by using an S-B-S block copolymer easily swellable or soluble in said petroleum products as a base material of a terminal detecting element capable of detecting the leakage of said petroleum products by detecting to any change in an electrical signal.

The S-B-S block copolymer to be used as a base material of the detective element of this invention is a copolymer comprising a middle polybutadiene block of a relatively low polymerization degree and two terminal polystyrene blocks of a relatively low polymerization degree each linked to one end of the middle block. Such a copolymer may be obtained, as disclosed in, for example, Japanese Pat. No. 23,798/65, by first polymerizing a monomer (e.g., styrene) to form a non-elastomeric polymer block A, adding to the polymerization mixture another monomer (e.g., butadiene) capable of forming an elastomeric polymer block B, allowing the polymerization to continue under the conditions which favor formation of an elastomeric polymer block B linked to one end of the non-elastomeric polymer block A, then adding to the polymerization mixture a monomer (e.g., styrene) capable of forming another terminal block A, and allowing the polymerization to continue under the conditions which favor formation of the terminal block A linked to another end of said elastomeric polymer block B. A typical example is given below.

Under a nitrogen atmosphere, 0.213 mole of n-butyllithium is added to a 15% (by weight) toluene solution containing 5.7 kg of styrene and polymerization is allowed to proceed at 45°C. for 4 hours until 99% or more of styrene are polymerized. To the polymerization mixture, is added a 15% (by weight) toluene solution containing 17.1 kg of 1,3-butadiene and polymerization is allowed to continue at 55°C for further 3 hours until almost all of the 1,3-butadiene are polymerized. To the resulting polymerization mixture, is added a 15% (by weight) toluene solution containing 5.7 kg of styrene and polymerization is allowed to proceed at 60°C. for further 3 hours until almost all of the monomers are polymerized. To the resulting polymerization mixture, is added 0.285 kg of phenyl-β-naphthylamine as a terminating agent to obtain an S-B-S block copolymer containing 60% of butadiene. This example shows a procedure for obtaining a block copolymer containing 60% of butadiene. An S-B-S block copolymer of any butadiene content may be obtained by varying the ratio between the weight of styrene and that of butadiene.

According to the experimental results obtained by the present inventors, an S-B-S block copolymers is useful as a base material of the present detecting element which easily swells or dissolves in petroleum products when the butadiene content of the copolymer is in the range from 50 to 70%, preferably from 60 to 70%, by weight. This is presumably because with the change in butadiene content, the distribution of polybutadiene blocks and polystyrene blocks throughout the polymer phase undergoes a change in the following manner. When the butadiene content is about 20% by weight, the phase structure of the copolymer is that of a sea-and-island type wherein the polybutadiene blocks are distributed in the sea of polystyrene blocks similarly to the structure of a general-purpose high-impact polystyrene (HIPS) which is a graft copolymer, whereas when the butadiene content is increased to 40 to 60% by weight, the said distribution becomes that of a locally stratified structure in the polymer. When the butadiene content is increased beyond 60% by weight, the copolymer assumes an entirely stratified structure in which the polybutadiene blocks and the polystyrene blocks exist in alternate layers, resulting in increased rate of swelling of the copolymer in petroleum products.

If the butadiene content exceeds 70% by weight, it is presumable that either the stratified structure further develops or there appears a phase structure of the sea-and-island type wherein the polystyrene-block phase is dispersed in the polybutadiene-block phase, contrary to the aforesaid case of lower butadiene content. Accordingly, the degree of swelling or the solubility of the copolymer having a butadiene content of exceeding 70% by weight in petroleum products such as gasoline, kerosene, and light oil would be increased, whereas the copolymer, like a rubber, becomes difficult to be fabricated into an article without curing and, moreover, becomes so sticky that troubles are expected most likely to arise in handling such a sticky material in manufacturing a base material of the present detective element and in subsequent operations such as assembling of the element in combination with other parts of a device. Moreover, an S-B-S block copolymer of a butadiene content exceeding 70% by weight is difficultly available because it is not in normal commercial production, though its manufacture is technically possible. On the other hand, an S-B-S block copolymer of a butadiene content below 50% by weight is unsatisfactory as a base material of the present detective element because of its insufficient rate of swelling or of dissolution in petroleum products such as gasoline, kerosene, and light oil owing probably to underdeveloped stratified structure of the copolymer.

In the S-B-S block copolymer for use in the present detective element, the copolymer has a molecular weight of 30,000 to 350,000.

The S-B-S block copolymer to be used in this invention shows the degree of swelling of 30 to 40 and 25 to 30% by weight in kerosene and light oil, respectively.

The degrees of swelling of various styrene-butadiene copolymers are as shown in Table 1.

Table 1

| Type of copolymer | Butadiene content, % by weight | Degree of swelling, % by weight Kerosene | Light oil |
|---|---|---|---|
| High-impact polystyrene (graft copolymer)* | 7 | | <1 |
| S-B-S block copolymer | 25 | Up to 5 | <1 |
| ″ | 60 | 30–40 | 25–30 |
| SB random copolymer** | 77 | | Up to 10 |

Note:
*Prepared by bulk suspension polymerization.
**Prepared by emulsion polymerization; Mooney viscosity, 52.

The advantages of the S-B-S block copolymer of a butadiene content of 50 to 70% by weight as a base material of the present detective element capable of detecting leakage of petroleum products by responding to the change in an electrical signal are not only its favorable properties common to commercial thermoplastic materials, such as feasibility of normal commercial production, easy-handling, easy-processing, desirable mechanical and physical properties, and reasonable price for the use under prevailing environmental conditions, but also its markedly superior swelling or solubility characteristics in petroleum products such as gasoline, kerosene, and light oil, as compared with polyolefins, rubbers, and other rubber-styrene copolymers.

Being excellent in water resistance to a comparable degree to that of a polyolefin and in flexibility to a comparable degree to that of a rubber, the S-B-S block copolymer of a butadiene content of 70% or less for use in this invention is capable of withstanding a strain or deformation without causing any loss in functions of a detective element and, in addition, can be easily shaped into various forms, similarly to other thermoplastic resin materials. Accordingly, when used as a material capable of easily swelling or dissolving in petroleum products, the S-B-S block copolymer containing 50 to 70% by weight of butadiene has no restriction with respect to shape and structure of the end product. Therefore, the shape and structure of the present detective element can be selected optionally according to the requirements and, hence, the element can be used in any combination with those conventional devices, circuits, and systems of electric signal. A typical example of an application is a limit switch in which an S-B-S block copolymer is used in the form of a block.

The detective element of this invention comprises as base material the aforesaid S-B-S block copolymer which has been imparted with electroconductivity by coating or mixing with an electroconductive metal such as, for example, gold, silver, copper or aluminum.

Examples of modes of constructing the detective element are given below.

1. One of the above-noted metals is vacuum-deposited on the surface of the S-B-S block copolymer in the form of shaped base material.
2. The S-B-S block copolymer in the form of shaped base material is overlaid with a foil of one of the above-noted metals.

3. The S-B-S block copolymer is mixed with a powder of one of the above-noted metals.
4. An electroconductive coating material comprising the S-B-S block copolymer as binder and a powder of one of the above-noted metals is applied on the surface of the S-B-S block copolymer in the form of shaped base material to form an electroconductive surface layer thereon.

The whole surface of the base material is not necessarily covered with a metal. The essential point is to construct a detective element so that it may become electroconductive and on contacting with petroleum products the base material may swell or dissolve, resulting in increased electric resistance of the element or cutoff of the path of electricity.

Of the modes of construction (1) to (4), the mode (4) is simplest and most effective. A suspension is prepared by dissolving the S-B-S block copolymer in a chlorinated hydrocarbon such as, for example, methylene chloride or chloroform; a hydrocarbon such as, for example, n-hexane, cyclohexane, benzene, or toluene; or a ketone such as, for example, acetone or methyl ethyl ketone and mixing the resulting solution with a powder of an electroconductive metal such as gold, silver, copper, or aluminum. The intended detective element is obtained by applying the thus obtained suspension on the surface of the base material by means of a customary technique such as dipping, spraying, or brushing to form on the surface of the base material a surface layer which is electroconductive and can swell or dissolve easily in petroleum products. It is an additional merit of the mode (4) that the time interval necessary for detecting a leakage may be controlled to some degree by properly regulating the ratio between the S-B-S block copolymer used as binder and the electroconductive metal powder and the thickness of applied coating.

The base material has no particular restriction with respect to its shape and may be in the form of wire, ribbon, rod, sheet, or block. Further, the base material can be laminated or mixed with a non-conductive supporting material such as, for example, polypropylene, polyethylene, high-impact polystyrene, phenol-formaldehyde resin, or urea-formaldehyde resin.

The invention is illustrated below in detail with reference to Examples, but the invention is not at all limited to the examples.

EXAMPLE 1

An S-B-S block copolymer of a butadiene content of 60% and a polypropylene were simultaneously extruded by using an extruder for thermoplastics to obtain a double-layered film, 20 mm in width, having the S-B-S copolymer layer, 45 $\mu$ in thickness, on top side and the polypropylene layer, 60 $\mu$ in thickness, on bottom side. A piece measuring 60 mm in length was cut from the film thus obtained. A commercial electroconductive coating material, which is composed of silver, low molecular weight polyacrylic acid and methyl ethyl ketone, was applied on top side of the piece of film to form a coating, 5 mm in width, along the longitudinal direction of the film to impart electroconductivity to the film (electric resistance; 2 ohms). On immersion of the film in a diesel gas oil and by measuring the electric resistance of the film along the longitudinal direction with volt-ohm-milliammeter it was found that electroconductivity of the coated film was completely lost in 15 seconds to 3 minutes.

EXAMPLE 2

An S-B-S block copolymer containing 60% of butadiene was extruded from an ordinary extruder for thermoplastics into a sheeting, 0.8 mm in thickness. Aluminum was vacuum deposited to a thickness of about 5 $\mu$ on one side of the sheeting according to a method described in "Polymer Signal Crystals" (by P. H. Geil, P 68 Interscience Pub., 1963) to impart electroconductivity to the sheeting. An oblong test specimen, 10 × 60 mm (having an electric resistance of 10 ohms), was cut from the conductive sheeting and tested in a manner similar to that in Example 1. It was found that electroconductivity was completely lost in 10 to 30 seconds.

EXAMPLE 3

An S-B-S block copolymer (60% butadiene content) was dissolved in chloroform to form a 5% (by weight) solution. To the resulting chloroform solution, was added with stirring a mixture (1 : 1 by weight) of paint-grade flake silver and powdered silver (300 mesh) to form a suspension of powdered silver, the weight ratio of silver to the block copolymer having been 1 to 5. The resulting silver suspension was coated on an ordinary high-impact polystyrene in the form of cord, 2 mm in diameter, to form a uniform layer of powdered silver around the cord, whereby electroconductivity was imparted to the cord. A test specimen (electric resistance, 3 ohms), 60 mm in length, was cut from the conductive cord and tested in a manner similar to that in Example 1. It was found that electroconductivity was completely lost in 2 to 5 seconds.

COMPARATIVE EXAMPLE

An S-B-S block copolymer of a butadiene content of 25% was formed into a sheeting in a manner similar to that in Example 2. Aluminum was vacuum deposited on the resulting sheeting to impart electroconductivity to the sheeting. A test specimen, 10 mm in width and 60 mm in length, having an electric resistance of 11 ohms was cut from the conductive sheeting and immersed in a diesel gas oil to test the loss in electroconductivity with the lapse of time. It was found that the electroconductivity was not completely lost after 1 hour or more.

What is claimed is:

1. An element for detecting and locating leakage of petroleum product by detecting the change in an electric signal, which element comprises a styrene-butadiene-styrene block copolymer of a butadiene content of 50 to 70% by weight and an electroconductive metal.

2. An element according to claim 1, wherein the electroconductive metal is gold, silver, copper, or aluminum.

3. An element according to claim 1, which is in the form of wire, ribbon, rod, sheet, or block.

4. An element according to claim 1, wherein the petroleum product is gasoline, kerosene, or light oil.

5. An element for detecting and locating leakage of petroleum product by detecting the change in an electric signal, which element is composed of a shaped article comprising a styrene-butadiene-styrene block copolymer of a butadiene content of 50 to 70% by weight and an electroconductive metallic layer vacuum-deposited on the surface of the shaped article.

6. An element for detecting and locating leakage of petroleum product by detecting the change in an electric signal, which element is composed of a shaped article comprising a styrene-butadiene-styrene block copolymer of a butadiene content of 50 to 70% by weight and an electroconductive metal foil adhered to the surface of the shaped article.

7. An element for detecting and locating leakage of petroleum product by detecting the change in an electric signal, which element is composed of a shaped article comprising a mixture of the styrene-butadiene-styrene block copolymer of a butadiene content of 50 to 70% by weight and an electroconductive powdered metal.

8. An element for detecting and locating leakage of petroleum product by detecting the change in an electric signal, which element is composed of a base material comprising the styrene-butadiene-styrene block copolymer of a butadiene content of 50 to 70% by weight and an electroconductive layer comprising the styrene-butadiene-styrene block copolymer of a butadiene content of 50 to 70% by weight and an electroconductive powdered metal.

9. An element for detecting and locating leakage of petroleum product by detecting the change in an electric signal, which element is composed of a nonelectroconductive base material and an electroconductive layer comprising the styrene-butadiene-styrene block copolymer of a butadiene content of 50 to 70% by weight and an electroconductive powdered metal.

10. A method for detecting and locating leakage of petroleum products from a carrier, comprising:
  sending an electric signal through a detecting means comprised of a styrene-butadiene-styrene block copolymer of a butadiene content of 50 to 70% by weight and an electroconductive metal which is adjacent to said carrier, and
  sensing change in said electric signal caused by a change of volume of said detecting means when contacted with said petroleum products.

* * * * *